US007942595B2

(12) United States Patent
Koizumi

(10) Patent No.: US 7,942,595 B2
(45) Date of Patent: May 17, 2011

(54) GEAR UNIT APPARATUS FOR PRINTER

(75) Inventor: Hideaki Koizumi, Tokyo (JP)

(73) Assignees: Kabushiki Kaisha Sato (JP); Sato Knowledge and Intellectual Property Institute (JP)

(*) Notice: Subject to any disclaimer, the term of this patent is extended or adjusted under 35 U.S.C. 154(b) by 730 days.

(21) Appl. No.: 11/939,907

(22) Filed: Nov. 14, 2007

(65) Prior Publication Data

US 2008/0264277 A1 Oct. 30, 2008

(30) Foreign Application Priority Data

Apr. 26, 2007 (JP) ................................. 2007-117395

(51) Int. Cl.
*B41J 11/00* (2006.01)
*B41J 29/02* (2006.01)

(52) U.S. Cl. ...................... 400/569; 400/636.2; 400/691

(58) Field of Classification Search ............... 400/636.2, 400/691, 120.01, 569
See application file for complete search history.

(56) References Cited

U.S. PATENT DOCUMENTS

| 5,198,836 | A | * | 3/1993 | Saito et al. | 347/222 |
| 5,238,314 | A | * | 8/1993 | Kitahara et al. | 400/208 |
| 5,496,120 | A | * | 3/1996 | Kakuguchi | 400/569 |
| 5,570,961 | A | * | 11/1996 | Osada et al. | 400/120.04 |
| 2001/0001273 | A1 | * | 5/2001 | Mori et al. | 400/660 |
| 2002/0012559 | A1 | * | 1/2002 | Takahashi et al. | 400/234 |
| 2005/0180796 | A1 | * | 8/2005 | Blanchard et al. | 400/613 |
| 2007/0218161 | A1 | * | 9/2007 | Nagano et al. | 425/451.9 |

FOREIGN PATENT DOCUMENTS

| EP | 1 719 628 | | 11/2006 |
| JP | 62-140043 | | 9/1987 |
| JP | 02261687 A | * | 10/1990 |
| JP | 3-269778 | | 12/1991 |
| JP | 07237324 A | * | 9/1995 |
| JP | 2005-238658 | | 9/2005 |

OTHER PUBLICATIONS

Japanese Patent Office Action mailed Jun. 21, 2010 in corresponding Japanese Application No. JP 2007-117395.
International Search Report mailed May 1, 2008 in corresponding PCT International Application No. PCT/JP2008/053191.

* cited by examiner

*Primary Examiner* — Daniel J Colilla
(74) *Attorney, Agent, or Firm* — Ostrolenk Faber LLP

(57) ABSTRACT

To provide a gear unit apparatus for a printer in which the assembling characteristics and maintenance workability of driving sections for transferring a printing paper to be printed can be improved, and particularly assembling, replacement and maintenance work can be easily performed on a platen roller and a transfer roller. The present invention focuses on unitizing a group of belts and a group of gears independently of a printer main body, and is configured such that a unit bracket that is detachable to a printer bracket is provided independently of the printer bracket, a drive motor, the belt group and the gear group are assembled to the unit bracket, and, when the unit bracket is attached to the printer bracket, a platen roller gear of a platen roller and a transfer roller gear of a transfer roller can be engaged with each other.

12 Claims, 16 Drawing Sheets

GEAR UNIT APPARATUS FOR PRINTER

BACKGROUND OF THE INVENTION

1. Field of the Invention

The present invention relates to a gear unit apparatus for a printer, and particularly to a gear unit apparatus for a printer, which rotary drives various rollers such as a platen roller or a transfer roller in a thermal printer.

2. Description of Related Art

In a conventional printer (e.g., a thermal printer), a printing paper such as a label, a tag or the like is sandwiched between a thermal head and a platen roller to transfer the printing paper by rotary driving the platen roll, and predetermined printing data is supplied to the thermal head to print information having a predetermined content onto the printing paper.

Moreover, in order to assist in the transfer of a relatively large printing paper, an auxiliary transfer roller (transfer roller) is disposed on an upstream side of the platen roller, or a board-extension roller (transfer roller) is provided for pulling only a board that is turned around in a releasing section in order to release the label from the board.

A group of various belts (timing belts) and a group of gears are used as the rotary driving force of a drive motor in order to rotary drive the various rollers (the transfer rollers such as the platen roller, auxiliary transfer roller and board-extension roller) in a direction of transferring the printing paper, but when these rollers wear out, the group of belts that is engaged with the group of gears needs to be removed once in order to exchange the rollers, deteriorating the replacement workability.

Moreover, these groups of belts and gears are generally provided on the reverse bracket within the printer housing, and removal and replacement of the various rollers are performed by opening and closing the printer cover, thus it is definitely not easy to replace the rollers. For this reason, the problem is that time and effort are involved in a maintenance check, negatively affecting the maintenance characteristics of the printer.

Since the various rollers are rotary driven by the drive motor via the groups of belts and gears, and because of a gap between the gears (backlash of the gears), it is difficult to ensure the position to start printing and the accuracy of the transfer control, and it is also difficult to improve the performance of the printer.

In addition, when it is necessary to change the print density in accordance with the information to be printed or the contents of a print design in a printing section, the print head needs to be switched to a thermal head that has different print dot density, and the speed of printing the printing paper also needs to be changed, thus the speed of transferring the printing paper by means of the drive motor is also changed.

However, if it is difficult to take a measurement for changing/correcting the printing speed and the transfer speed using only software by means of a print controller, it is necessary to mechanically change the groups of belts and gears by changing the route of the group of belts, requiring new assembly work in order to make such changes.

It should be noted that the tension of the group of belts combined with the group of gears needs to adjusted, but if the group of belts are embedded particularly within a narrow space of the printer main body, it is difficult to carry out the adjustment work.

SUMMARY OF THE INVENTION

The present invention is contrived in view of the above problems, and it is an object of the present invention to provide a gear unit apparatus for a printer, which is capable of improving assembling characteristics and maintenance characteristics of a driving section for transferring a printing paper to be printed.

It is another object of the present invention to provide a gear unit apparatus for a printer, in which particularly a platen roller and a transfer roller (auxiliary transfer roller and board-extension roller) are easily assembled, replaced and maintained.

It is yet another object of the present invention to provide a gear unit apparatus for a printer, which unities a group of gears and a group of belts, and ensures easiness and reliability in attaching/detaching the unit with respect to the printer main body side.

It is yet another object of the present invention to provide a gear unit apparatus for a printer, which can improve the accuracy of a gap between the gears (backlash), and contributes to the improvement of the printing quality and the transfer accuracy.

It is yet another object of the present invention to provide a gear unit apparatus for a printer, which can easily take a measure to change print density in a printing section.

It is yet another object of the present invention to provide a gear unit apparatus for a printer, which can easily change the transfer speed of the platen roller or transfer roller without changing the component formation, when changing the print density.

It is yet another object of the present invention to provide a gear unit apparatus for a printer, which can be set up even in a narrow space and can easily adjust the tension of the group of belts.

It is yet another object of the present invention to provide a gear unit apparatus for a printer, which can adjust the tension of the group of belts by using a small number of components.

Specifically, the present invention focuses on unitizing a belt group and a gear group independently of a printer main body, and specifically on providing the belt group and the gear group in a unit bracket provided independently of a printer bracket. Also, the present invention is a gear unit apparatus for a printer, which has: a printer bracket; a printing section that has a platen roller rotatably attached to the printer bracket and performs printing on a printing paper; a transfer roller that is rotatably attached to the printer bracket and transfers the printing paper; a drive motor that rotary drives the platen roller and the transfer roller; a belt group that transmits rotary driving force of the drive motor to the platen roller and the transfer roller; and a gear group that is engaged with the belt group, wherein a unit bracket that is detachable to the printer bracket is provided independently of the printer bracket, the drive motor, the belt group and the gear group are assembled to the unit bracket, and, when the unit bracket is attached to the printer bracket, a platen roller gear of the platen roller and a transfer roller gear of the transfer roller are engageable with the gear group.

The unit bracket is provided with a unit bracket side engaging/disengaging section that is engageable/disengageable with a printer bracket side engaging/disengaging section formed in the printer bracket, a part of the gear group of the unit bracket is engageable/disengageable with the platen roller gear and the transfer roller gear on the printer bracket side by means of engagement/disengagement between the printer bracket side engaging/disengaging section and the unit bracket side engaging/disengaging section, and leading end sections of the printer bracket side engaging/disengaging section and the unit bracket side engaging/disengaging section that face each other are formed into a taper shape.

A relative location of the belt group in relation to the gear group is switchable in accordance with print density in the printing section.

The gear ratio of the gear group is switchable in accordance with print density in the printing section.

The belt group has a first belt, a second belt, and a third belt, and the gear group has: a first gear that is engaged with the first belt engaged with an output gear of the drive motor; a second gear and third gear that are coaxial with the first gear and switchably engaged with the second belt; a fourth gear that is engaged with the second belt; a fifth gear that is coaxial with the fourth gear and engaged with the third belt; a sixth gear that is coaxial with the fourth gear and engaged with the platen roller gear of the platen roller; a seventh gear that is engaged with the third belt; and an eighth gear that is coaxial with the seventh gear and engaged with the transfer roller gear of the transfer roller.

The gear group has a switching gear that is engageable with the second belt as well as the third gear engaged with the second belt.

When the second belt is switched from the second gear to the third gear, the gear group changes the gear ratio of the output gear of the drive motor to the platen roller gear and transfer roller gear from approximately 0.5645 to approximately 0.3763.

In the gear group, the number of teeth of the output gear of the drive motor is 22n, the number of teeth of the first gear is 60n, the number of teeth of the second gear is 27n, the number of teeth of the third gear is 18n, the number of teeth of the fourth gear is 57n, the number of teeth of the fifth gear is 65n, the number of teeth of the sixth gear is 52n, the number of teeth of the seventh gear is 30n, the number of teeth of the eighth gear is 24n, the number of teeth of the platen roller gear is 16n, and the number of teeth of the transfer roller gear is 16n, where n is an arbitrary natural number.

The length of the fourth gear in the axial direction thereof has at least the total of the lengths of the second gear and the third gear in the axial directions thereof.

The gear group has a five-stage structure that is constituted by: a first belt route formed by the output gear of the drive motor and the first gear, through which the first belt passes; a second belt route formed by the second gear and the fourth gear, through which the second belt passes; a third belt route formed by the third gear and the fourth gear, through which the second belt passes; a fourth belt route formed by the fifth gear and the seventh gear, through which the third belt passes; and a gear level in which the sixth gear is engaged with the platen roller gear of the platen roller, and in which the eighth gear is engaged with the transfer roller gear of the transfer roller.

The unit bracket is provided with a tension adjusting mechanism capable of adjusting the tension of the belt group engaged with the gear group.

The unit bracket and the pair of the platen roller and the transfer roller are provided opposite to each other with respect to the printer bracket.

The drive motor can be a stepping motor.

The belt group can be a group of timing belts.

In the gear unit apparatus for a printer according to the present invention, a unit bracket provided independently of a printer bracket is provided with: a drive motor as a driving section for transferring a printing paper; a belt group; and a gear group. Therefore, by removing the unit bracket from the printer main body (printer bracket) side, the engagement between the gear group and a platen roller or various transfer rollers is canceled, whereby these rollers can be easily removed from the printer main body so that replacement of the rollers and other maintenance checks can be executed with a good workability. Particularly the assembling characteristics and maintenance characteristics of the driving section including the belt group and the gear group can be improved.

Particularly, leading end sections of the printer bracket side engaging/disengaging section and the unit bracket side engaging/disengaging section that face each other are formed into a taper shape, whereby when the unit bracket is assembled to the printer bracket, the assembling position can be determined accurately. Also, the assembling workability can be improved and the number of man-hours involved in the assembling work can be reduced significantly. Moreover, the amount of backlash of the gears can be kept within a predetermined level, and the printing performance can be stabilized and improved.

Particularly, a relative location of the belt group in relation to the gear group is made switchable in accordance with print density in the printing section so as to be able to respond to a plurality of print densities by means of one gear unit, and the number of man-hours involved in the assembling work can be reduced significantly.

Particularly, the unit bracket is provided with a tension adjusting mechanism capable of adjusting the tension of the belt group engaged with the gear group, whereby the tension of the belt group can be adjusted within the unit bracket, and tension adjustment can be realized within a small space.

DESCRIPTION OF THE PREFERRED EMBODIMENTS

According to the present invention, a gear group, which is engaged with various rollers assembled to a printer bracket and rotary drives these various rollers, is independently incorporated within a unit bracket along with a belt group, and this unit bracket is assembled to the printer bracket, whereby a gear unit apparatus for a printer having a good assembling workability stable performance and capable of easily performing replacement of the rollers and maintenance work is realized.

Embodiments

Next, the gear unit apparatus for a printer according to embodiments of the present invention is described with reference to FIG. 1 through FIG. 16.

Figure 1:
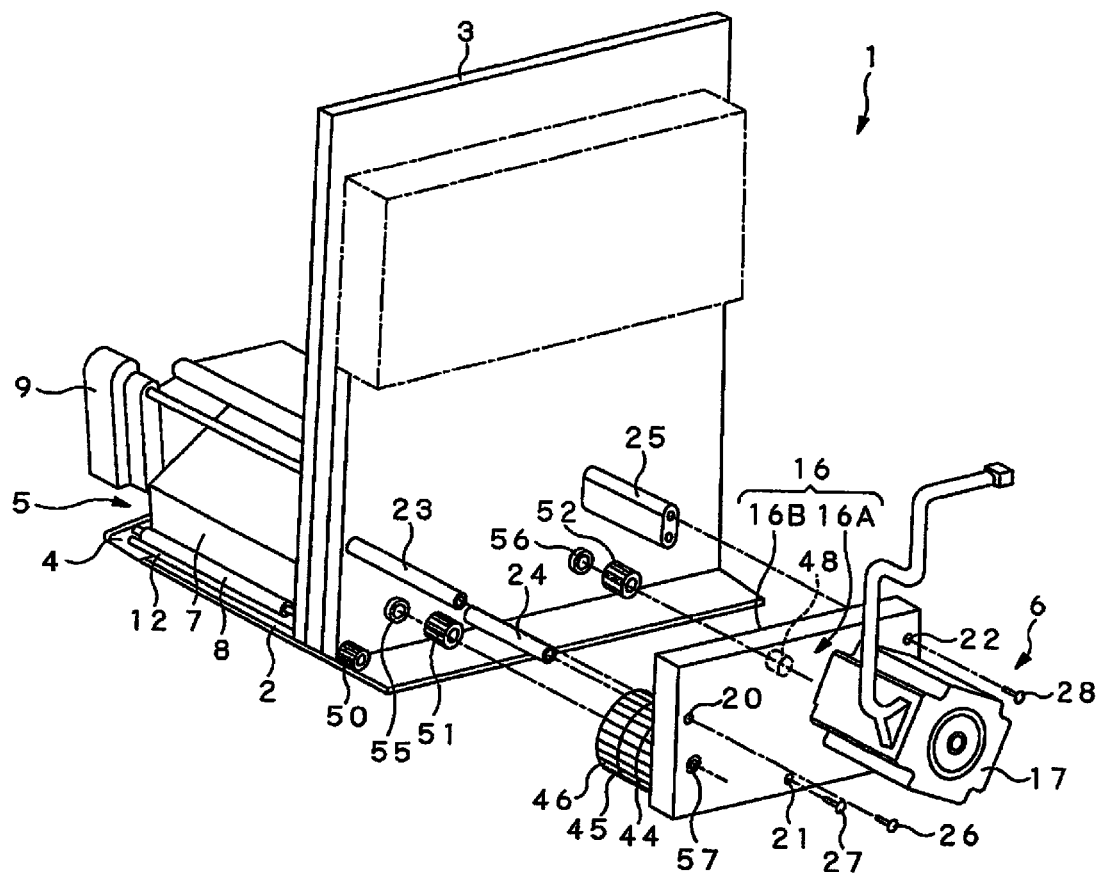
FIG. 1 is a perspective view showing a substantial part of a printer (e.g., a thermal printer 1) equipped with a gear unit apparatus 6 according to an embodiment of the present invention.

FIG. 1 is a perspective view of a substantial part of a printer (a thermal printer 1, for example), wherein the thermal printer 1 has a base plate 2, a printer bracket 3, a sub-bracket 4, a printing section 5, and a gear unit apparatus 6.

The base plate 2 is disposed such that the printer bracket 3 and the sub-bracket 4 have an open space therebetween and are disposed parallel to each other, and such that the printer bracket 3 and the sub-bracket 4 are fixedly attached to the base plate 2 so as to be vertical thereto. Also, the printing section 5 is provided on one side of the printer bracket 3, and the gear unit apparatus 6 is provided on the other side (opposite side).

Figure 2:
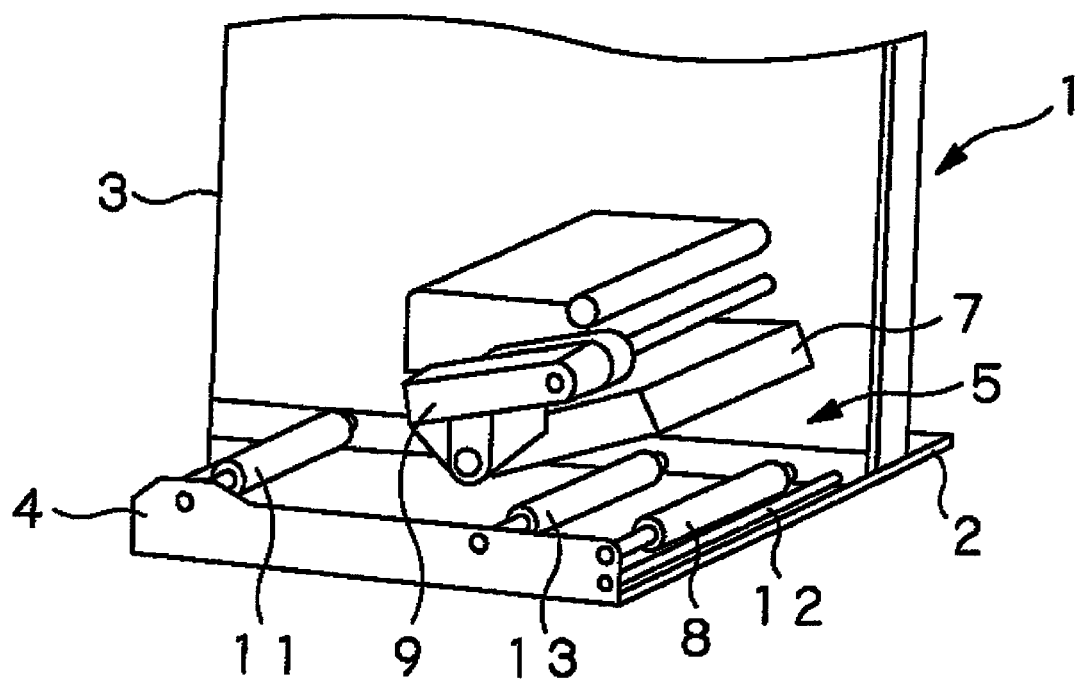
FIG. 2 is a perspective view showing a substantial part of a printing section 5 that is located on the side opposite to the gear unit apparatus 6 with respect to a printer bracket 3.

FIG. 2 is a perspective view showing a substantial part of the printing section 5 that is located on the side opposite to the gear unit apparatus 6 with respect to a printer bracket 3, wherein the printing section 5 has a thermal head 7 and a platen roller 8. A thermal transfer ribbon can be used as the printing section 5 in accordance with the type of a printing paper P, but the illustration and explanation thereof is omitted.

By rotary operating an operation lever 9, the thermal head 7 can be opened/closed with respect to the platen roller 8, and the printing paper P can be inserted therebetween.

The platen roller 8 is rotatably provided between the printer bracket 3 and the sub-bracket 4 to transfer the printing paper P and performs printing on the printing paper P by means of the thermal head 7.

Figure 3:
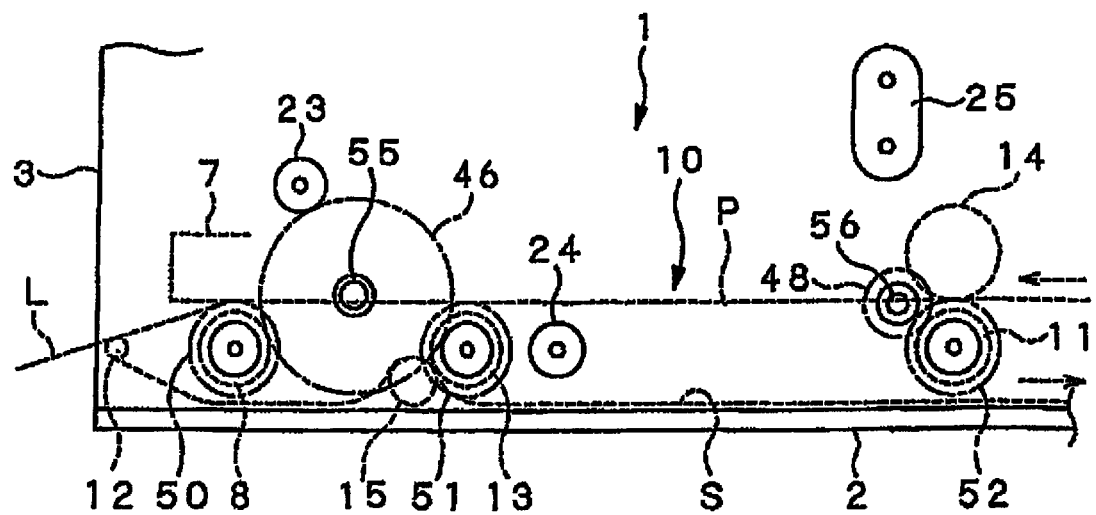
FIG. 3 is a side view of the printing section 5, which is viewed from the gear unit apparatus 6 side in the printer bracket 3.

FIG. 3 is a side view of the printing section 5, which is viewed from the gear unit apparatus 6 side in the printer bracket 3. As shown in FIG. 2 and FIG. 3, a transfer path 10 for transferring the printing paper P toward the printing section 5 is formed, an auxiliary transfer roller 11 (transfer roller) is provided on an upstream side of the transfer path 10, and a board-extension roller 13 (transfer roller) is provided on a lower side of a release pin 12 (on the right side in FIG. 3) located on a downstream side of the platen roller 8.

The auxiliary transfer roller 11 and the board-extension roller 13 are both disposed rotatably between the printer bracket 3 and the sub-bracket 4, as with the platen roller 8.

Particularly as shown in FIG. 3, the auxiliary transfer roller 11 holds the printing paper P with an auxiliary transfer driven roller 14 facing the auxiliary transfer roller 11, to transfer the printing paper P.

The board-extension roller 13 holds a board S of the printing paper P with a board driven roller 15 facing the board-extension roller 13, thereby pulls and transfers the board S backward to release a label L by means of the release pin 12.

Figure 4:
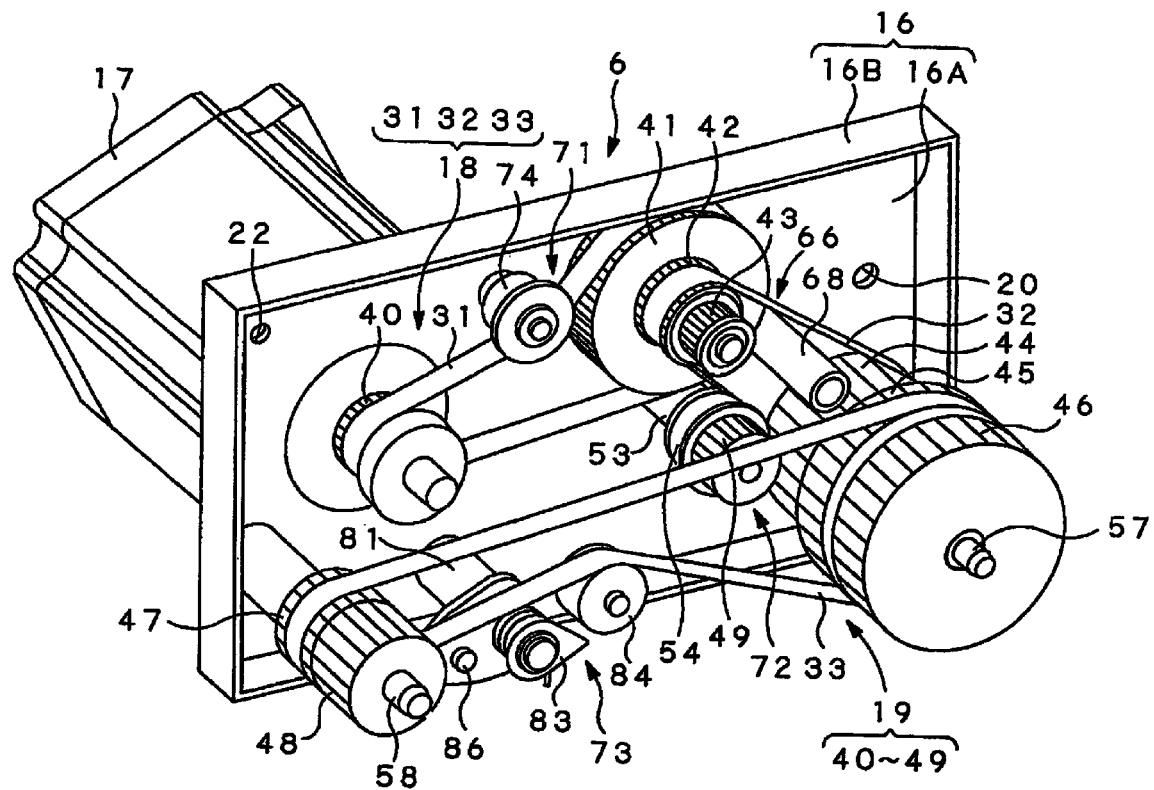
FIG. 4 is a perspective view in which the gear unit apparatus 6 is viewed from the printer bracket 3 side.
Figure 5:
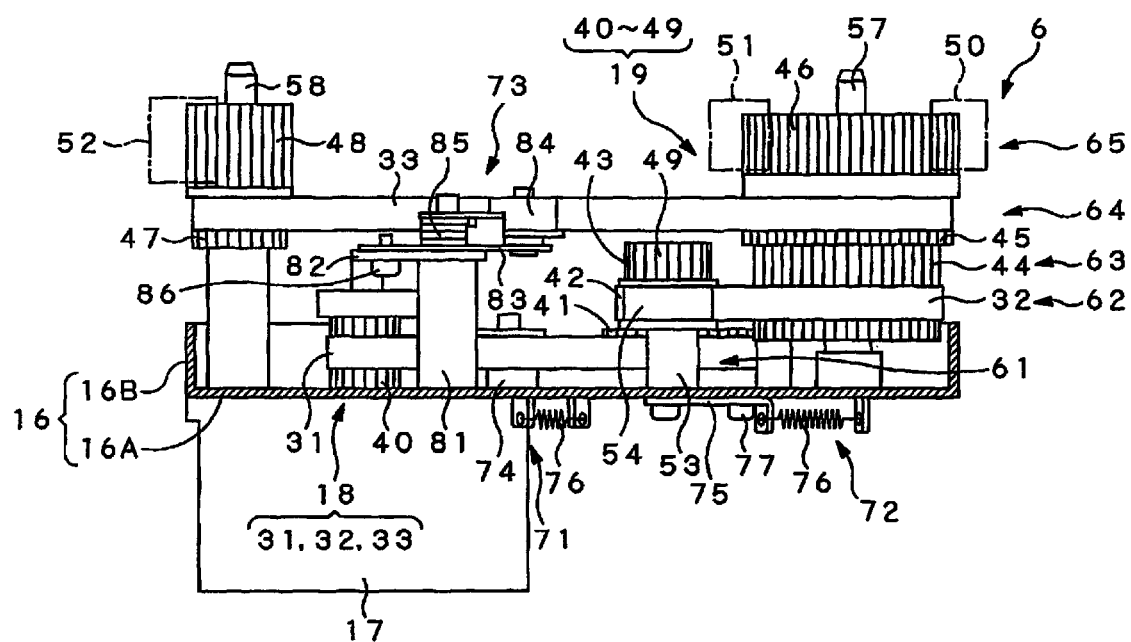
FIG. 5 is a partially cut-out plan view in which the gear unit apparatus 6 is viewed from below.
Figure 6:
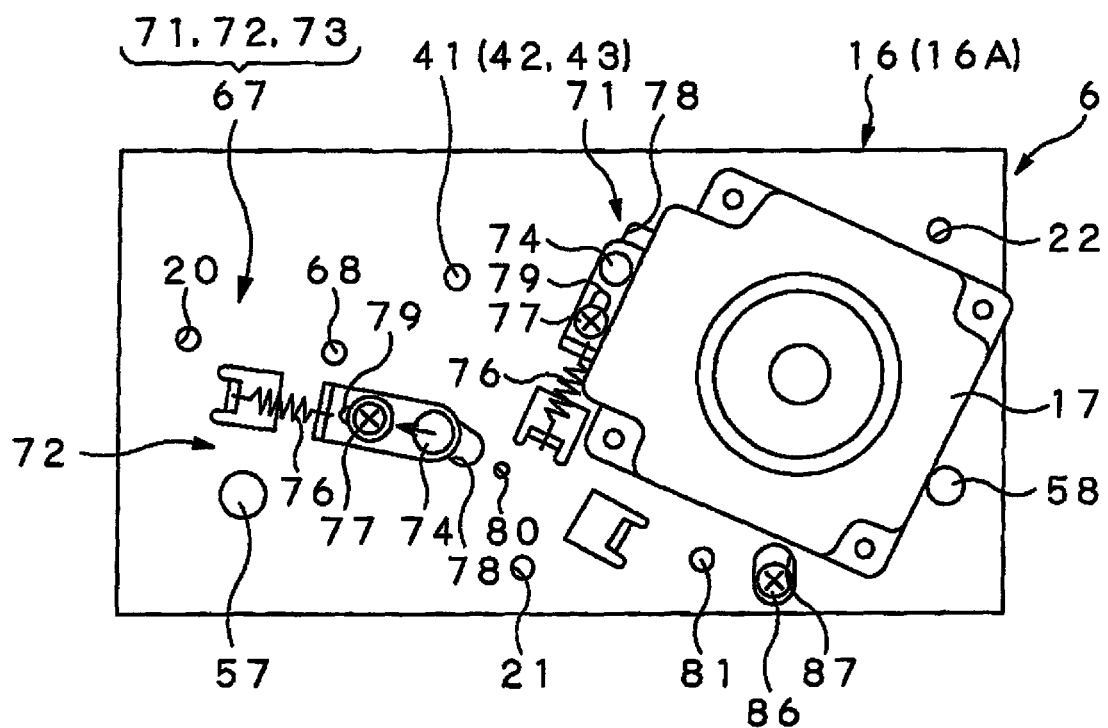
FIG. 6 is a back view of the gear unit apparatus 6.
Figure 7:
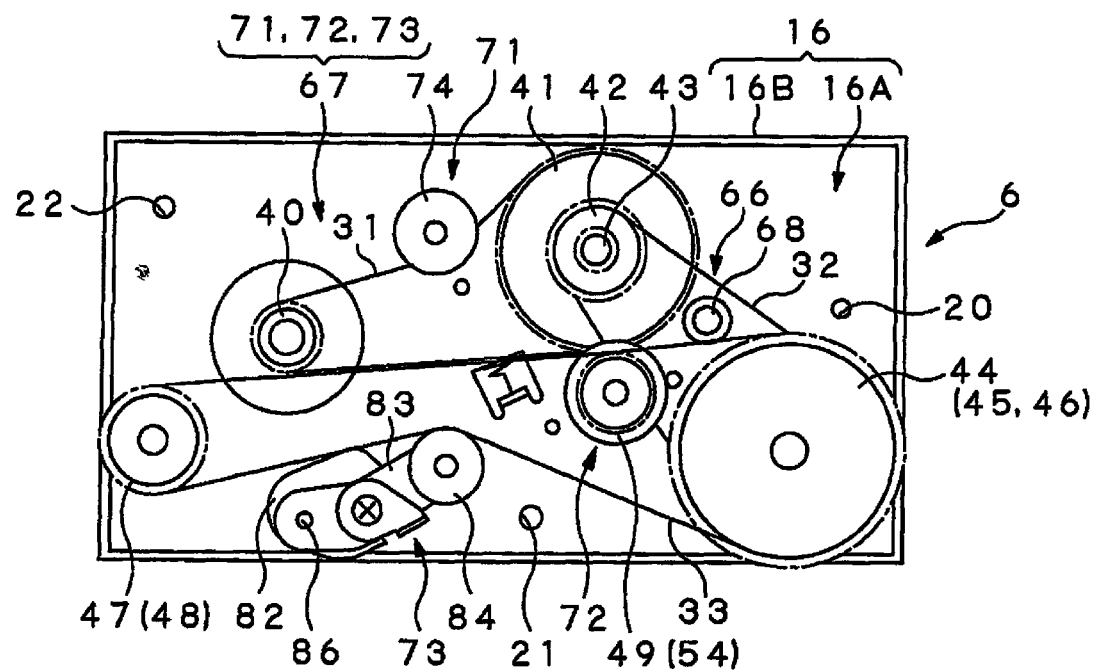
FIG. 7 is a front view in which the gear unit apparatus 6 is viewed from the printer bracket 3 side.

FIG. 4 is a perspective view in which the gear unit apparatus 6 is viewed from the printer bracket 3 side, FIG. 5 is a partially cut-out plan view in which the gear unit apparatus 6 is viewed from below, FIG. 6 is a back view of the gear unit apparatus 6, and FIG. 7 is a front view in which the gear unit apparatus 6 is viewed from the printer bracket 3 side.

The gear unit apparatus 6 has a unit bracket 16, a drive motor 17, a belt group 18, and a gear group 19.

The unit bracket 16 is detachable with respect to the printer bracket 3 independently of the printer bracket 3, and has a rectangular central plate 16A and a square-shaped peripheral rim section 16B surrounding the central plate 16A. The unit bracket 16 and the set of the platen roller 8, the auxiliary transfer roller 11 and the board-extension roller 13 are provided opposite to each other with respect to the printer bracket 3.

Particularly as shown in FIG. 1, attachment holes 20, 21, 22 are formed on three sections on the central plate 16A. The unit bracket 16 (gear unit apparatus 6) is fixedly attached, by means of attachment bolts 26, 27, 28, to attachment rods 23, 24, 25 that are provided in a protruding manner on the printer bracket 3 on the unit bracket 16 side so as to correspond to the attachment holes 20, 21, 22.

The drive motor 17 rotary drives the platen roller 8, auxiliary transfer roller 11 and board-extension roller 13. The unit bracket 16 is assembled so as to have the drive motor 17 on the outside thereof, and the belt group 18 and the gear group 19 on the inside.

The belt group 18 and the gear group 19 engaged with the belt group 18 transmit rotary driving force of the drive motor 17 to the platen roller 8, auxiliary transfer roller 11 and board-extension roller 13.

As shown particularly in FIG. 4 and FIG. 5, the belt group 18 has a first belt 31, a second belt 32, and a third belt 33 that are timing belts.

As shown particularly in FIG. 4 and FIG. 5, the gear group 19 has an output gear 40 of the drive motor 17, a first gear 41, second gear 42, third gear 43, fourth gear 44, fifth gear 45, sixth gear 46, seventh gear 47, eighth gear 48, and switching gear 49.

The first gear 41 is engaged with the first belt 31 engaged with the output gear 40 of the drive motor 17.

The second gear 42 and the third gear 43 are coaxial with the first gear 41 and engaged switchably with the second belt 32 (see FIG. 9 and FIG. 10 described hereinafter). However, the shaft diameter of the third gear 43 is smaller than the shaft diameter of the second gear 42.

The fourth gear 44 is engaged with the second belt 32.

The fifth gear 45 is coaxial with the fourth gear 44 and engaged with the third belt 33.

The sixth gear 46 is coaxial with the fourth gear 44 and, as shown particularly in FIG. 5 (and FIG. 12 described hereinafter), engaged with a platen roller gear 50 of the platen roller 8 and a board-extension roller gear 51 (transfer roller gear) of the board-extension roller 13. However, the shaft diameters of the fourth gear 44, fifth gear 45 and sixth gear 46 increase in this order.

The seventh gear 47 is engaged with the third belt 33.

The eighth gear 48 is coaxial with the seventh gear 47 and, as shown particularly in FIG. 5 (and FIG. 12 described hereinafter), engaged with an auxiliary transfer roller gear 52 (transfer roller gear) of the auxiliary transfer roller 11. However, the shaft diameter of the eighth gear 48 is larger than the shaft diameter of the seventh gear 47.

The switching gear 49 can be engaged with the second belt 32 as well as the third gear 43 engaged with the second belt 32 (see FIG. 10 described hereinafter). However, as shown particularly in FIG. 5, a gear shaft 53 of the switching gear 49 is provided coaxially with a tension roller 54 at a lower side of the switching gear 49, the tension roller 54 rotating freely as with the switching gear 49. This tension roller 54 is brought into contact with the second belt 32 from the outside thereof by predetermined suppress strength, to configure the second tension adjusting section 72 (described in FIG. 13 and FIG. 14 hereinafter).

As shown particularly in FIG. 1, a pair of printer bracket side engaging/disengaging holes 55, 56 (printer bracket side engaging/disengaging sections) are formed in the printer bracket 3.

The gear shaft 57 (unit bracket side engaging/disengaging section) of the sixth gear 46 (the fourth gear 44 and the fifth gear 45) and the gear shaft 58 (unit bracket side engaging/disengaging section) of the eighth gear 48 (the seventh gear 47) of the unit bracket 16 can be engaged/disengaged with respect to the printer bracket side engaging/disengaging holes 55, 56 respectively.

By means of this engagement/disengagement, a part or the leading end section of the gear group 19 of the unit bracket 16 is engaged/disengaged with respect to a roller gear on the printer bracket 3 side.

Specifically, the sixth gear 46 is engaged/disengaged with respect to the platen roller gear 50 of the platen roller 8 on the printer bracket 3 side and with respect to the board-extension roller gear 51 of the board-extension roller 13, and the eighth gear 48 is engaged/disengaged with respect to the auxiliary transfer roller gear 52 of the auxiliary transfer roller 11.

Accordingly, when the unit bracket 16 is attached to the printer bracket 3, the platen roller gear 50 of the platen roller 8, the board-extension roller gear 51 of the board-extension roller 13, and the auxiliary transfer roller gear 52 of the auxiliary transfer roller 11 are engaged/disengaged with respect to the gear group 19 on the unit bracket 16 side (the sixth gear 46 and the eighth gear 48).

Figure 8:
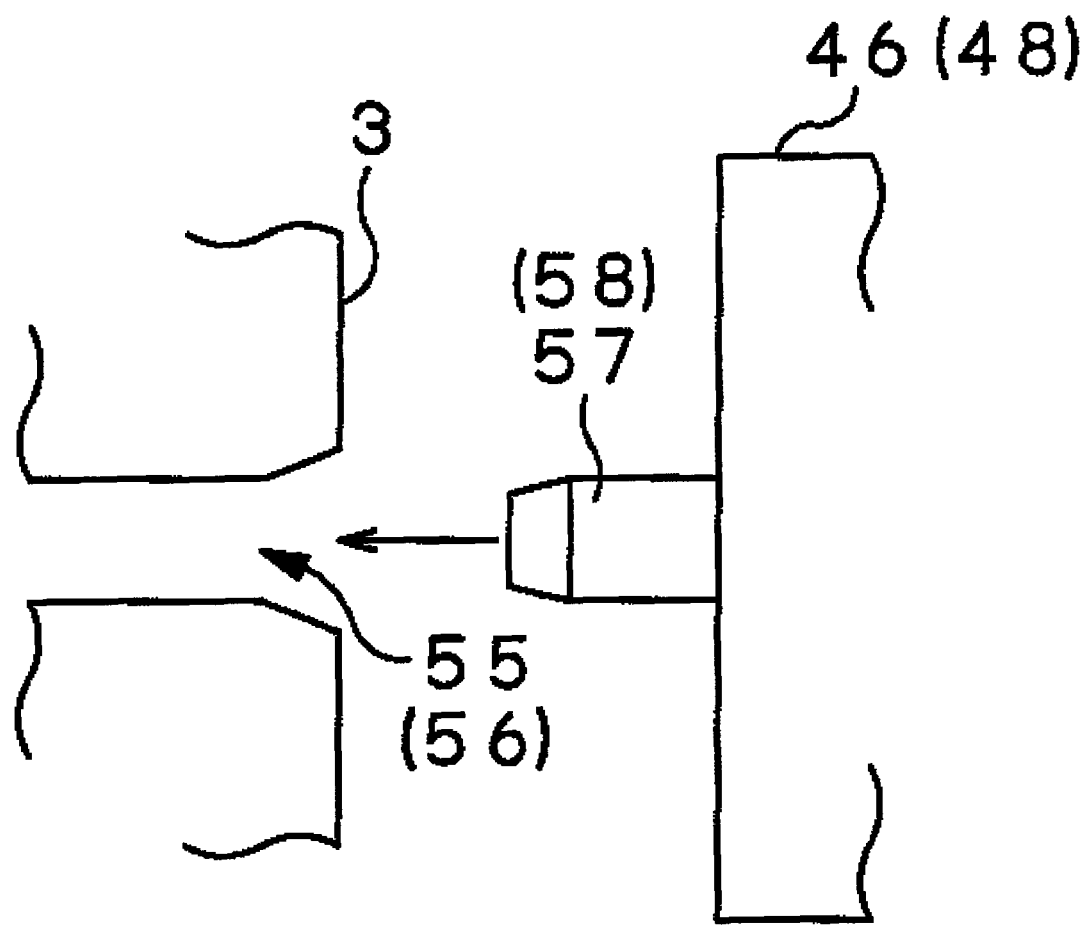
FIG. 8 is a schematic cross-sectional view showing a substantial part of a printer bracket side engaging/disengaging hole 55, 56 and a gear shaft 57, 58.

Furthermore, FIG. 8 is a schematic cross-sectional view showing a substantial part of the printer bracket side engaging/disengaging hole 55, 56 and the gear shaft 57, 58, wherein leading end sections of the printer bracket side engaging/disengaging section 55, 56 and the gear shaft 57, 58 that face each other are formed into a taper shape as shown in the figure.

Accordingly, when the unit bracket 16 is attached to the printer bracket 3, leading end opening sections of the printer bracket side engaging/disengaging holes 55, 56 and the leading end sections of the gear shafts 57, 58 can guide each other, whereby an easy and reliable engaging operation or assembling operation can be performed. Moreover, relative locations of the unit bracket 16 and the printer bracket 3 can be determined accurately, whereby backlashes in the sixth gear 46 and the eighth gear 48 on the unit bracket 16 side with respect to the platen roller gear 50, board-extension roller gear 51 and auxiliary transfer roller gear 52 on the printer bracket 3 side can be kept within a predetermined level, as a result of which stable engagements can be realized among the gears, and the accuracy of transferring the printing paper P can be improved, contributing to the improvement of print quality.

As shown particularly in FIG. 4 and FIG. 5, length of the fourth gear 44 in the axial direction thereof has at least the total of the lengths of the second gear 42 and the third gear 43 in the axial directions thereof.

Also, as shown in FIG. 5, the gear group 19 has a five-stage structure that is constituted by: a first belt route 61 formed by the output gear 40 of the drive motor 17 and the first gear 41, through which the first belt 31 passes; a second belt route 62 formed by the second gear 42 and the fourth gear 44, through which the second belt 32 passes; a third belt route 63 formed by the third gear 43 and the fourth gear 44, through which the second belt 32 passes; a fourth belt route 64 formed by the fifth gear 45 and the seventh gear 47, through which the third belt 33 passes; and a gear level 65 in which the sixth gear 46 is engaged with the platen roller gear 50 of the platen roller 8 and with the board-extension roller gear 51, and in which the eighth gear 48 is engaged with the auxiliary transfer roller gear 52 of the auxiliary transfer roller 11.

On the basis of this five-stage structure, as described hereinafter, when the transfer speed is switched by the change in the print density in the printing section 5, such switching can be performed by slightly changing the belt group 18 (bringing the second belt 32 wrapped around the second gear 42 to the third gear 43).

It should be noted that the unit bracket 16 is provided with a guide mechanism 66 of the belt group 18 and a tension adjusting mechanism 67.

As shown particularly in FIG. 4 and FIG. 7, the guide mechanism 66 has a guide rod 68 standing on the central plate 16A of the unit bracket 16 between the first gear 41 (the second gear 42, the third gear 43) and the fourth gear 44 (the fifth gear 45, the sixth gear 46), and is used when a route of the belt group 18 (the second belt 32) is changed by the change in the print density in the printing section 5, as described hereinafter (see FIG. 10 and FIG. 12).

Figure 9:
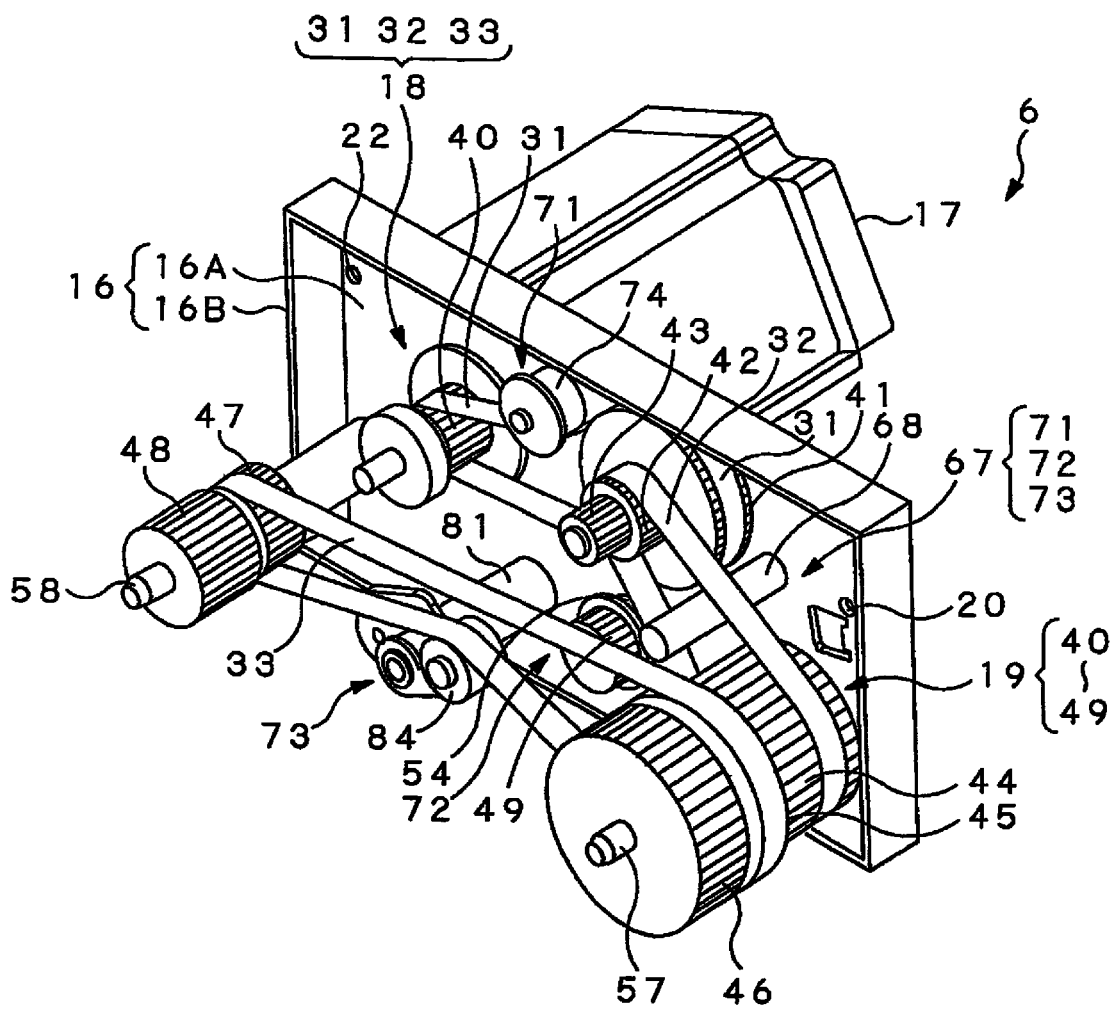
FIG. 9 is a perspective view of the gear unit apparatus 6 in the case in which a first print density (transfer speed) is obtained by wrapping a second belt 32 around a second gear 42 and a fourth gear 44.
Figure 10:
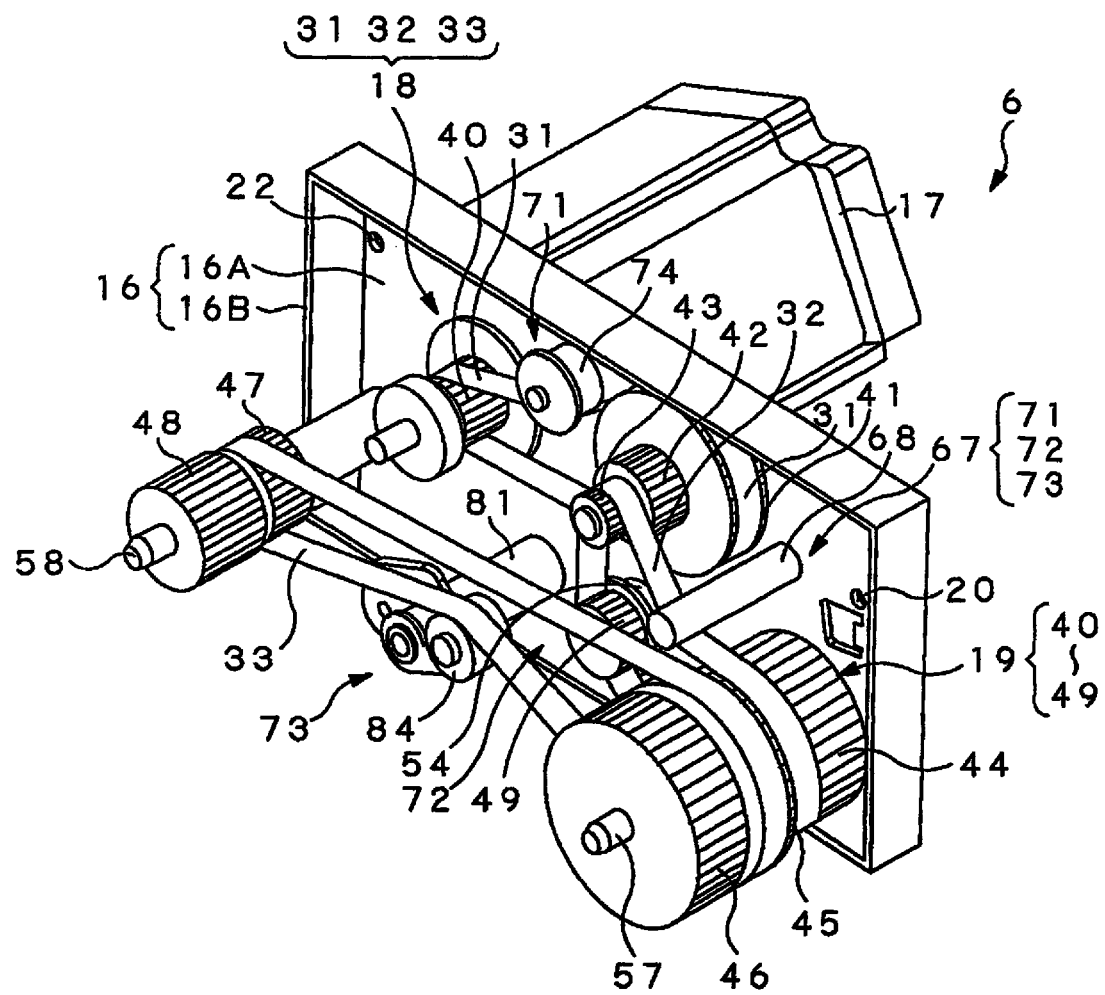
FIG. 10 is a perspective view of the gear unit apparatus 6 in the case in which a second print density (transfer speed) is obtained by wrapping the second belt 32 around a third gear 43 and the fourth gear 44.

FIG. 9 is a perspective view of the gear unit apparatus 6 in the case in which a first print density (transfer speed) is obtained by wrapping the second belt 32 around the second gear 42 and fourth gear 44, and FIG. 10 is a perspective view of the gear unit apparatus 6 in the case in which a second print density (transfer speed) is obtained by wrapping the second belt 32 around the third gear 43 and fourth gear 44.

In the state shown in FIG. 9, the guide rod 68 is not in contact with the second belt 32, but only the tension roller 54 coaxial with the switching gear 49 is brought into contact, as the second tension adjusting section 72, with the second belt 32 from the outer circumference thereof by predetermined suppress strength, whereby the tension can be adjusted (described hereinafter as the second tension adjusting section 72).

In the state shown in FIG. 10, the second belt 32 is wrapped around the third gear 43 and fourth gear 44 via the guide rod 68, the guide rod 68 is brought into contact with the second belt 32, and the switching gear 49 is brought into contact with the second belt 32 from the inner circumference thereof, whereby the tension can be adjusted as the second tension adjusting section 72.

Specifically, the tension adjusting mechanism 67 can adjust the tension of the belt group 18 engaged with the gear group 19, and has the first tension adjusting section 71 that adjusts the tension of the first belt 31, the second tension adjusting section 72 that adjusts the tension of the second belt 32, and the third tension adjusting section 73 that adjusts the tension of the third belt 33.

The first tension adjusting section 71 and the second tension adjusting section 72 have substantially the same structure, except that different rollers are brought into contact with the belts (the first belt 31 and the second belt 32).

Figure 11:
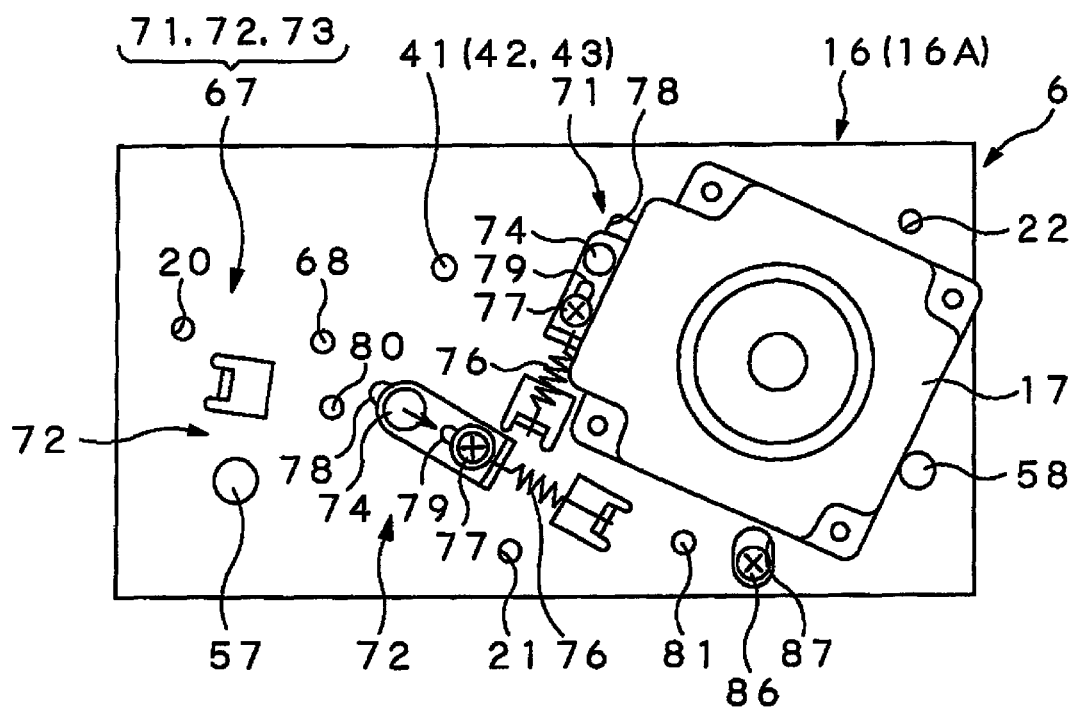
FIG. 11 is a plan view of a first tension adjusting section 71 and a second tension adjusting section 72 that are viewed from an external surface side of a unit bracket 16.
Figure 12:
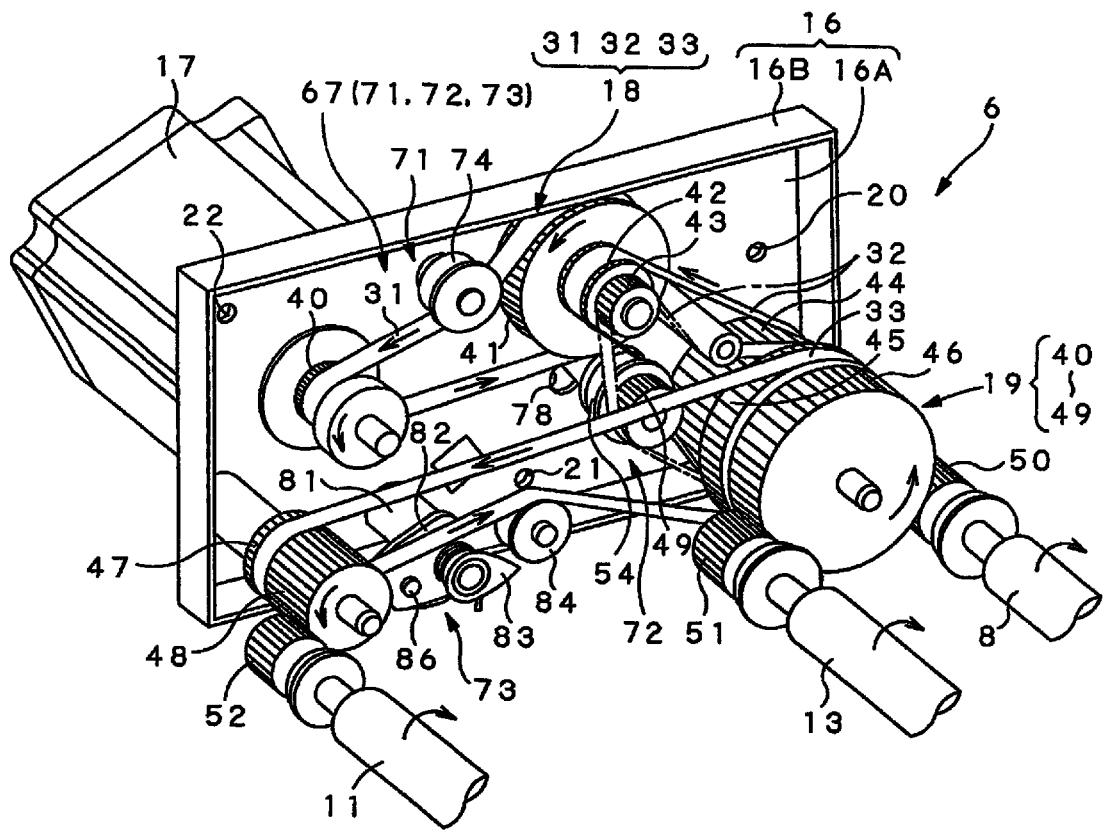
FIG. 12 is a perspective view in which the unit bracket 16 is viewed from an internal surface side thereof.
Figure 13:
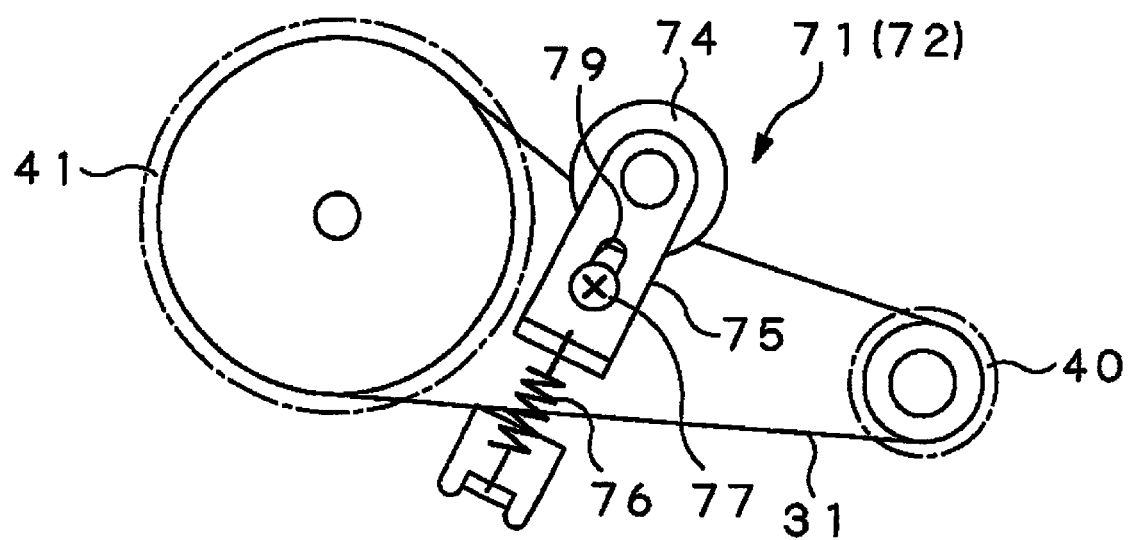
FIG. 13 is a plan view showing a substantial part of the first tension adjusting section 71.
Figure 14:
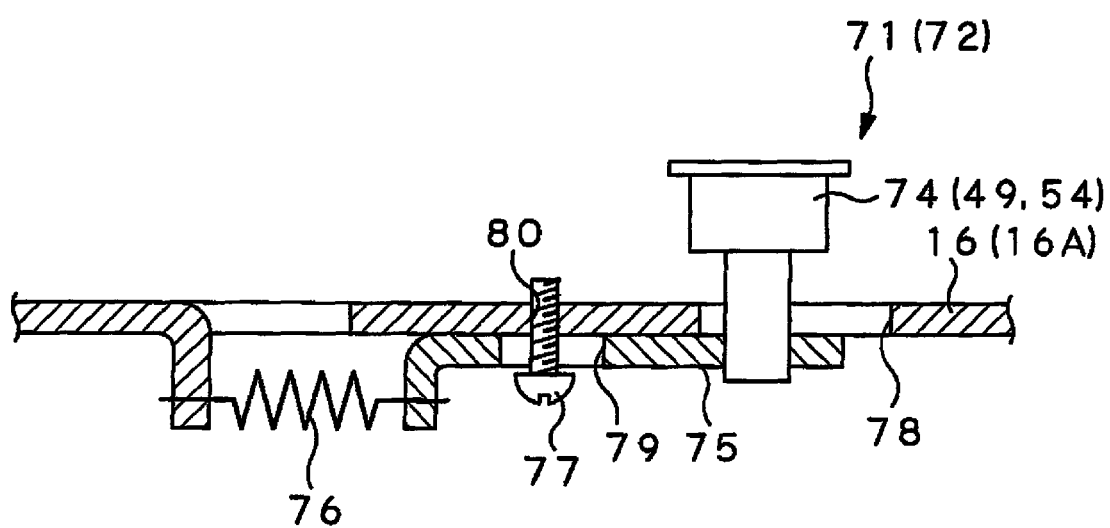
FIG. 14 is a cross-sectional view showing a substantial part of the first tension adjusting section 71.

FIG. 11 is a plan view of the first tension adjusting section 71 and the second tension adjusting section 72 that are viewed from an external surface side of the unit bracket 16, FIG. 12 is a perspective view in which the unit bracket 16 is viewed from an internal surface side thereof, FIG. 13 is a plan view showing a substantial part of the first tension adjusting section 71, and FIG. 14 is a cross-sectional view showing the same substantial part.

It should be noted that FIG. 6 and FIG. 11 are the same plan view showing the gear unit apparatus 6 from the outer circumference side (back side), except that FIG. 6 shows a first attachment state of the second tension adjusting section 72 corresponding to the first print density in the printing section 5, while FIG. 11 shows a second attachment state of the second tension adjusting section 72 corresponding to the second print density in the printing section 5. The attachment state of the first tension adjusting section 71 does not change for both the first print density and the second print density.

As shown in FIG. 14, the first tension adjusting section 71 has a tension roller 74, a supporting plate 75, an extension spring 76, and a fixation screw 77.

Although not shown, the second tension adjusting section 72 has the switching gear 49 and the tension roller 54 coaxial therewith, which are used in place of the tension roller 74, as well as the supporting plate 75, extension spring 76, and fixation screw 77.

The tension roller 74 is positioned on the first belt 31 side through a through-hole 78 punctured in the unit bracket 16 (central plate 16A) (see also FIG. 13), the position of the fixation screw 77 is adjusted within an elongated window 79 formed in the supporting plate 75, and the fixation screw 77 is fixed to a screw hole 80 of the central plate 16A, whereby the abutting force of the tension roller 74 against the first belt 31 can be adjusted to adjust the tension of the first belt 31.

Moreover, the above-described adjustment work can be performed in a state in which the unit bracket 16 is removed from the printer bracket 3, thus a good workability can be obtained.

It should be noted that, as described above, the structure itself for the tension adjustment of the second tension adjusting section 72 is the same as that of the first tension adjusting section 71, except that the switching gear 49 and the tension roller 54 coaxial therewith, which are used in place of the tension roller 74, abut on the second belt 32 in the case of the second tension adjusting section 72, thus the explanation thereof is omitted.

However, as shown in FIG. 6 and FIG. 11, the direction in which the extension spring 76 pulls the supporting plate 75 when the second belt 32 is wrapped around the second gear 42 is opposite to the direction of the same when the second belt 32 is wrapped around the third gear 43.

Specifically, as shown in FIG. 6, in the first attachment state of the second tension adjusting section 72 corresponding to the first print density in the printing section 5, the tension roller 54 needs to push the second belt 32 inward from the outer circumference thereof, as in the second belt route 62 (FIG. 5). Therefore, the extension spring 76 is configured to pull the supporting plate 75 to the upper left in FIG. 6 from the through-hole 78, which is a central shaft hole common to the first attachment state and the second attachment state.

As shown in FIG. 11, on the other hand, in the second attachment state of the second tension adjusting section 72 corresponding to the second print density in the printing section 5, the switching gear 49 needs to push the second belt 32 outward from the inner circumference thereof, as in the third belt route 63 (FIG. 5). Therefore, the extension spring 76 is configured to pull the supporting plate 75 to the lower right in FIG. 6 from the through-hole 78.

The third tension adjusting section 73 needs to abut on the third belt 33 passing through the fourth belt route 64 (FIG. 5) that is located distant from the unit bracket 16 and in the vicinity of the printer bracket 3, i.e., in an upper section spaced-apart from the central plate 16A, and needs to adjust the tension of the third belt 33. Therefore, slightly different configurations are adopted in the first tension adjusting section 71 and the second tension adjusting section 72 respectively.

Figure 15:
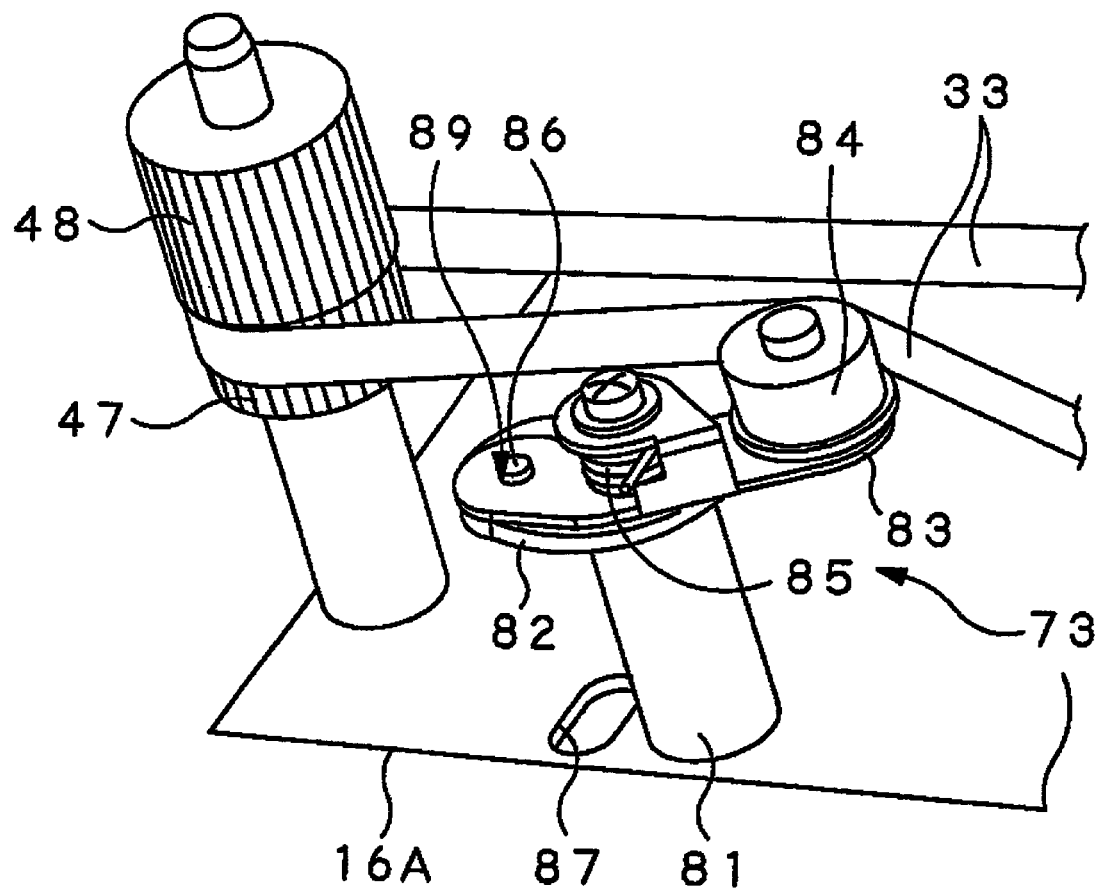
FIG. 15 is a perspective view of a third tension adjusting section 73.
Figure 16:
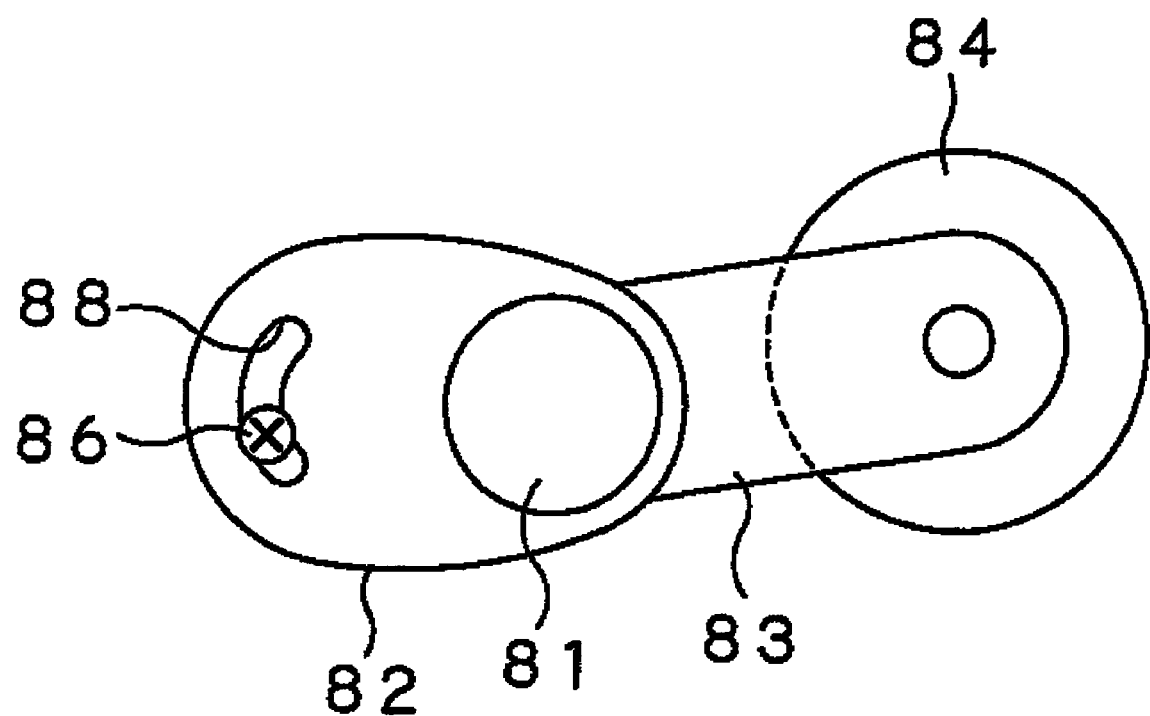
FIG. 16 is a back view viewed from a central plate 16A (with the third tension adjusting section 73 on the back side).

Specifically, FIG. 15 is a perspective view of the third tension adjusting section 73, and FIG. 16 is a back view viewed from the central plate 16A (with the third tension adjusting section 73 on the back side), wherein the third tension adjusting section 73 has a supporting rod 81, a fixation plate 82 that is fixed at a top surface of the supporting rod 81 so as to extend parallel to the central plate 16A, a supporting plate 83 that is superimposed on the fixation plate 82, a tension roller 84 that is attached to one end of the supporting plate 83 so as to be able to rotate freely, a coil spring 85, and a fixation screw 86.

The supporting rod 81 holds a section having a height between the surface of the central plate 16A and the fourth belt route 64, and positions the tension roller 84 attached to the end of the supporting plate 83 on the third belt 33 side.

The fixation screw 86 is made rotatable by inserting a screwdriver (not shown) into a screwdriver through-hole 87 punctured in the central plate 16A. The position of the fixation screw 86 is adjusted within a crescent-shaped elongated window 88 (FIG. 16) formed in the fixation plate 82, and then the fixation screw 86 is fixed to a screw hole 89 of the supporting plate 83, whereby the abutting force of the tension roller 84 against the third belt 33 can be adjusted to adjust the tension of the third belt 33.

Moreover, the above-described adjustment work can be performed in a state in which the unit bracket 16 is removed from the printer bracket 3, thus a good workability can be obtained.

Next, in the present invention, the relative location of the belt group 18 (specifically, the second belt 32) in relation to the gear group 19 is made switchable between the second belt route 62 and the third belt route 63 (see FIG. 5) in accordance with print density in the printing section 5.

For example, in the case in which the density of heater elements of the thermal head 7, which is the print density, needs to be changed from the first print density, e.g., 8 dots/mm (203 dpi) (dot per inch) to the second print density, e.g., 12 dots/mm (305 dpi), it is necessary to change (reduce) the printing speed (transfer speed) in response to these print densities. Specifically, the gear ratio of the platen roller 8 to the drive motor 17 and the transfer speed are reduced.

Specifically, the gear ratio of the gear group 19 is switched in accordance with the print density in the printing section 5.

More specifically, when the second belt 32 is switched from the second gear 42 to the third gear 43 (i.e., when the print density is switched from 8 dots/mm (203 dpi) to a higher density, 12 dots/mm (305 dpi)), the gear group 19 changes the gear ratio between the output gear 40 of the drive motor 17 and the platen roller gear 50 and transfer roller gear from approximately 0.5645 to approximately 0.3763.

Specifically, in the gear group 19, the number of teeth of the output gear 40 of the drive motor 17 is 22n, the number of teeth of the first gear 41 is 60n, the number of teeth of the second gear 42 is 27n, the number of teeth of the third gear 43 is 18n, the number of teeth of the fourth gear 44 is 57n, the number of teeth of the fifth gear 45 is 65n, the number of teeth of the sixth gear 46 is 52n, the number of teeth of the seventh gear 47 is 30n, the number of teeth of the eighth gear 48 is 24n, the number of teeth of the platen roller gear 50 is 16n, and the number of teeth of the transfer roller gear (the board-extension roller gear 51, the auxiliary transfer roller gear 52, FIG. 12) is 16n, where n is an arbitrary natural number.

Therefore, when n=1, the second belt 32 is engaged with the second gear 42 having "27" teeth when the print density is 203 dpi, thus the gear ratio of the platen roller gear 50 and board-extension roller gear 51 to the output gear 40 is:

$$(20/60)\times(27/57)\times(52/16)\cong 0.5645.$$

Also, the second belt 32 is engaged with the third gear 43 having "18" teeth when the print density is 305 dpi, thus the gear ratio is:

$$(20/60)\times(18/57)\times(52/16)\cong 0.3763.$$

Similarly, when the print density is 203 dpi, the gear ratio of the auxiliary transfer roller gear 52 to the output gear 40 is:

$$(20/60)\times(27/57)\times(65/30)\times(24/16)\cong 0.5645.$$

Furthermore, when the print density is 305 dpi, the gear ratio is:

$$(20/60)\times(18/57)\times(65/30)\times(24/16)\cong 0.3763.$$

Therefore, when the number of revolutions of the drive motor 17 is 6000 pps (pitch per second), and when the print density is 203 dpi, the transfer speed of the platen roller 8, auxiliary transfer roller 11 and board-extension roller 13 is:

$$6000\times 0.5645 = 3387 \text{ pps}.$$

Also, when the print density is 305 dpi, the transfer speed is:

$$6000\times 0.3763 \cong 2258 \text{ pps}.$$

Accordingly, when the print density is changed, the transfer speed of the printing paper P needs to be changed to the corresponding speed.

In the configurations of the thermal printer 1 and gear unit apparatus 6, the gear unit apparatus 6 itself can be easily attached/detached with respect to the printer bracket 3 of the thermal printer 1 by means of the attachment bolts 26, 27 and 28 (FIG. 1). At the time of mounting, the gear shaft 57 of the sixth gear 46 and the gear shaft 58 of the eighth gear 48 in the unit bracket 16 are engaged with the printer bracket side engaging/disengaging holes 55 and 56 respectively.

By means of this engagement, out of the gear group 19 of the unit bracket 16, the sixth gear 46 is engaged with the platen roller gear 50 of the platen roller 8 on the printer bracket 3 side and with the board-extension roller gear 51 of the board-extension roller 13, and the eighth gear 48 is engaged with the auxiliary transfer roller gear 52 of the auxiliary transfer roller 11, whereby the rotary driving force of the drive motor 17 can be transmitted to the platen roller 8, auxiliary transfer roller 11 and board-extension roller 13.

Therefore, simply by mounting the gear unit apparatus 6 onto the printer bracket 3, the belt group 18 and the gear group 19 of the drive motor 17 can be engaged with the platen roller 8, the auxiliary transfer roller 11, and the board-extension roller 13, thus the operation itself is extremely simple.

Moreover, simply by detaching the gear unit apparatus 6 from the printer bracket 3, i.e., without contacting the belt group 18 or gear group 19, the connection among the driving sections for the platen roller 8, auxiliary transfer roller 11 and board-extension roller 13 is canceled so that these rollers can be replaced easily, whereby necessary maintenance checks can be performed easily.

Accordingly, the assembling characteristics and maintenance workability of the driving sections for transferring the printing paper P to be printed (including the unit bracket 16 having the drive motor 17, belt group 18 and gear group 19, and the platen roller 8, auxiliary transfer roller 11 and board-extension roller 13 on the printer bracket 3 side, etc.) can be improved, easiness and reliability in attaching/detaching the unit bracket 16 with respect to the printer bracket 3 can be ensured, and the print density in the printing section 5 can be changed easily.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A gear unit apparatus for a printer, comprising:
a printer bracket;
a printing section that has a platen roller rotatably attached to the printer bracket and performs printing on a printing paper;
a transfer roller that is rotatably attached to the printer bracket and transfers the printing paper;
a drive motor that rotary drives the platen roller and the transfer roller;
a belt group that transmits rotary driving force of the drive motor to the platen roller and the transfer roller; and
a gear group that is engaged with the belt group,
wherein a unit bracket that is detachable to the printer bracket is provided independently of the printer bracket, the drive motor, the belt group and the gear group are assembled to the unit bracket, and, when the unit bracket is attached to the printer bracket, a platen roller gear of the platen roller and a transfer roller gear of the transfer roller are engageable with the gear group; and
wherein the unit bracket is provided with a unit bracket side engaging/disengaging section that is engageable/disengageable with a printer bracket side engaging/disengaging section formed in the printer bracket, a part of the gear group of the unit bracket is engageable/disengageable with the platen roller gear and the transfer roller gear on the printer bracket side by means of engagement/disengagement between the printer bracket side engaging/disengaging section and the unit bracket side engaging/disengaging section, and leading end sections of the printer bracket side engaging/disengaging section and the unit bracket side engaging/disengaging section that face each other are formed into a taper shape, the unit bracket side engaging/disengaging section comprising a plurality of gear shafts of the gear group, the printer bracket side engaging/disengaging section comprising a plurality of engaging/disengaging holes with which the plurality of gear shafts can be engaged/disengaged, the plurality of gear shafts being engaged/disengaged with the platen roller gear and the transfer roller gear by engaging/disengaging the plurality of engaging/disengaging holes.

2. A gear unit apparatus for a printer, comprising:
a printer bracket;
a printing section that has a platen roller rotatably attached to the printer bracket and performs printing on a printing paper;
a transfer roller that is rotatably attached to the printer bracket and transfers the printing paper;
a drive motor that rotary drives the platen roller and the transfer roller;
a belt group that transmits rotary driving force of the drive motor to the platen roller and the transfer roller; and
a gear group that is engaged with the belt group,
wherein a unit bracket that is detachable to the printer bracket is provided independently of the printer bracket, the drive motor, the belt group and the gear group are assembled to the unit bracket, and, when the unit bracket is attached to the printer bracket, a platen roller gear of the platen roller and a transfer roller gear of the transfer roller are engageable with the gear group; and wherein a relative location of the belt group in relation to the gear group is changeable in accordance with print density in the printing section.

3. The gear unit apparatus for a printer according to claim 2, wherein the gear ratio of the gear group is changeable in accordance with print density in the printing section.

4. The gear unit apparatus for a printer according to claim 2, wherein the unit bracket is provided with a tension adjusting mechanism capable of adjusting the tension of the belt group engaged with the gear group.

5. The gear unit apparatus for a printer according to claim 2, wherein the unit bracket and the pair of the platen roller and the transfer roller are provided opposite to each other with respect to the printer bracket.

6. A gear unit apparatus for comprising:
a printer bracket;
a printing section that has a platen roller rotatably attached to the printer bracket and performs printing on a printing paper;
a transfer roller that is rotatably attached to the printer bracket and transfers the printing paper;
a drive motor that rotary drives the platen roller and the transfer roller;
a belt group that transmits rotary driving force of the drive motor to the platen roller and the transfer roller; and
a gear group that is engaged with the belt group,
wherein a unit bracket that is detachable to the printer bracket is provided independently of the printer bracket, the drive motor, the belt group and the gear group are assembled to the unit bracket, and, when the unit bracket is attached to the printer bracket, a platen roller gear of the platen roller and a transfer roller gear of the transfer roller are engageable with the gear group; and
wherein the belt group comprises a first belt, a second belt, and a third belt, and
the gear group comprises:
an output gear of the drive motor;
a first gear that is engaged with the first belt, the first belt also being engaged with the output gear of the drive motor;
a second gear and a third gear that are coaxial with the first gear and switchably engaged with the second belt;
a fourth gear that is engaged with the second belt;
a fifth gear that is coaxial with the fourth gear and engaged with the third belt;
a sixth gear that is coaxial with the fourth gear and engaged with the platen roller gear of the platen roller;
a seventh gear that is engaged with the third belt; and
an eighth gear that is coaxial with the seventh gear and engaged with the transfer roller gear of the transfer roller.

7. The gear unit apparatus for a printer according to claim 6, wherein the gear group further comprises a switching gear that is engaged with the second belt when the third gear is engaged with the second belt.

8. The gear unit apparatus for a printer according to claim 6, wherein when the second belt is switched from the second gear to the third gear, the gear group changes the gear ratio of the output gear of the drive motor to the platen roller gear and transfer roller gear from approximately 0.5645 to approximately 0.3763.

9. The gear unit apparatus for a printer according to claim 6, wherein, in the gear group,
the number of teeth of the output gear of the drive motor is $22n$,
the number of teeth of the first gear is $60n$,
the number of teeth of the second gear is $27n$,
the number of teeth of the third gear is $18n$,
the number of teeth of the fourth gear is $57n$,
the number of teeth of the fifth gear is $65n$,
the number of teeth of the sixth gear is $52n$,
the number of teeth of the seventh gear is $30n$,
the number of teeth of the eighth gear is $24n$,
the number of teeth of the platen roller gear is $16n$, and
the number of teeth of the transfer roller gear is $16n$, where $n$ is an arbitrary natural number.

10. The gear unit apparatus for a printer according to claim 6, wherein the length of the fourth gear in the axial direction thereof has at least the total of the lengths of the second gear and the third gear in the axial directions thereof.

11. The gear unit apparatus for a printer according to claim 6, wherein the gear group has a five-stage structure that is constituted by:
a first belt route formed by the output gear of the drive motor and the first gear, through which the first belt passes;
a second belt route formed by the second gear and the fourth gear, through which the second belt passes;
a third belt route formed by the third gear and the fourth gear, through which the second belt passes;
a fourth belt route formed by the fifth gear and the seventh gear, through which the third belt passes; and
a gear level in which the sixth gear is engaged with the platen roller gear of the platen roller, and in which the eighth gear is engaged with the transfer roller gear of the transfer roller.

12. A gear unit apparatus for a printer, comprising:
a printer bracket;
a printing section that has a platen roller rotatably attached to the printer bracket and performs printing on a printing paper;
a transfer roller that is rotatably attached to the printer bracket and transfers the printing paper;
a drive motor that rotary drives the platen roller and the transfer roller;
a belt group that transmits rotary driving force of the drive motor to the platen roller and the transfer roller; and
a gear group that is engaged with the belt group,
wherein a unit bracket that is detachable to the printer bracket is provided independently of the printer bracket, the drive motor, the belt group and the gear group are assembled to the unit bracket, and, when the unit bracket is attached to the printer bracket, a platen roller gear of the platen roller and a transfer roller gear of the transfer roller are engageable with the gear group; and
wherein the belt group comprises a first belt, a second belt, and a third belt, and
the gear group comprises:
an output gear of the drive motor;
a first gear that is engaged with the first belt, the first belt also being engaged with the output gear of the drive motor; and
a second gear and a third gear that are coaxial with the first gear and switchably engaged with the second belt.

* * * * *